United States Patent
Xu et al.

(10) Patent No.: US 11,637,780 B2
(45) Date of Patent: *Apr. 25, 2023

(54) POLICY MAPPING METHOD AND DEVICE, AND USER EQUIPMENT

(71) Applicant: GUANGDONG OPPO MOBILE TELECOMMUNICATIONS CORP., LTD., Guangdong (CN)

(72) Inventors: Yang Xu, Guangdong (CN); Haorui Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/454,584

(22) Filed: Nov. 11, 2021

(65) Prior Publication Data

US 2022/0070100 A1 Mar. 3, 2022

Related U.S. Application Data

(63) Continuation of application No. 17/164,549, filed on Feb. 1, 2021, now Pat. No. 11,196,672, which is a continuation of application No. PCT/CN2019/096231, filed on Jul. 16, 2019.

(51) Int. Cl.
*H04L 47/20* (2022.01)
*H04W 76/10* (2018.01)
*H04W 48/16* (2009.01)

(52) U.S. Cl.
CPC .............. *H04L 47/20* (2013.01); *H04W 48/16* (2013.01); *H04W 76/10* (2018.02)

(58) Field of Classification Search
CPC ........ H04L 47/20; H04W 76/10; H04W 48/16
See application file for complete search history.

(56) References Cited

U.S. PATENT DOCUMENTS

| 8,711,822 B2 | 4/2014 | De Vega De La Red |
| 10,602,422 B1* | 3/2020 | Jagannatha ........... H04W 40/02 |
| 10,708,836 B1* | 7/2020 | Buyukdura ........... H04W 48/18 |

(Continued)

FOREIGN PATENT DOCUMENTS

| CN | 101568162 A | 10/2009 |
| CN | 101631354 A | 1/2010 |

(Continued)

OTHER PUBLICATIONS

3GPP TS 23.503 V15.0.0 (Dec. 2017) "Technical Specification Group Services and System Aspects; Policy and Charging Control Framework for the 5G System; Stage 2 (Release 15)", 3GPP Draft; 23503-F00, Jan. 29, 2018, XP051384055. 56 pages.

(Continued)

*Primary Examiner* — Michael J Moore, Jr.
(74) *Attorney, Agent, or Firm* — Perkins Coie LLP

(57) ABSTRACT

The embodiments of the disclosure provide a policy mapping method and device and user equipment (UE). The method includes that: UE maps all policies or part of policies used in a first mobile communication system to a policy used in a second mobile communication system, the policies used in the first system including at least one of an access network discovery and selection policy (ANDSP) and a UE route selection policy (URSP).

20 Claims, 9 Drawing Sheets

(56) References Cited

U.S. PATENT DOCUMENTS

| | | | |
|---|---|---|---|
| 10,952,088 B2* | 3/2021 | Ryu | H04W 24/10 |
| 10,972,956 B2* | 4/2021 | Huang-Fu | H04W 76/22 |
| 11,196,672 B2* | 12/2021 | Xu | H04W 36/0011 |
| 2010/0322212 A1 | 12/2010 | Vera et al. | |
| 2012/0020347 A1 | 1/2012 | De | |
| 2013/0142042 A1 | 6/2013 | Garcia et al. | |
| 2018/0227826 A1 | 8/2018 | Abraham et al. | |
| 2019/0124561 A1 | 4/2019 | Faccin et al. | |
| 2019/0150081 A1* | 5/2019 | Qiao | H04W 48/18 370/329 |
| 2019/0268835 A1* | 8/2019 | Shan | H04W 48/16 |
| 2019/0297121 A1* | 9/2019 | Qiao | H04L 65/1016 |
| 2019/0306752 A1* | 10/2019 | Lai | H04W 28/0925 |
| 2019/0335534 A1* | 10/2019 | Atarius | H04M 15/66 |
| 2019/0394279 A1* | 12/2019 | Dao | H04W 40/02 |
| 2020/0007450 A1* | 1/2020 | Chin | H04L 47/20 |
| 2020/0053622 A1* | 2/2020 | Huang-Fu | H04W 76/20 |
| 2020/0107190 A1* | 4/2020 | Tang | H04W 12/033 |
| 2020/0128507 A1* | 4/2020 | Ryu | H04W 60/04 |
| 2020/0162958 A1* | 5/2020 | Huang-Fu | H04W 56/001 |
| 2020/0187085 A1* | 6/2020 | Jagannatha | H04W 72/10 |
| 2020/0187088 A1* | 6/2020 | Chun | H04W 48/02 |
| 2020/0228936 A1* | 7/2020 | Talebi Fard | H04W 8/186 |
| 2020/0236528 A1* | 7/2020 | Lee | H04W 60/04 |
| 2020/0304983 A1* | 9/2020 | Zhu | H04W 36/00 |
| 2020/0404107 A1* | 12/2020 | Cheng | H04W 76/12 |
| 2020/0404567 A1* | 12/2020 | Tang | H04W 36/14 |
| 2020/0412559 A1* | 12/2020 | Tang | H04W 40/24 |
| 2021/0029253 A1* | 1/2021 | Xu | H04M 15/62 |
| 2021/0029628 A1* | 1/2021 | Kim | H04W 76/19 |
| 2021/0037380 A1* | 2/2021 | Lee | H04W 68/00 |
| 2021/0120596 A1* | 4/2021 | Youn | H04W 8/08 |
| 2021/0160186 A1* | 5/2021 | Xu | H04W 36/0011 |
| 2021/0194970 A1* | 6/2021 | Li | H04W 40/24 |
| 2021/0195490 A1 | 6/2021 | Rommer et al. | |
| 2021/0227438 A1* | 7/2021 | Xu | H04W 36/0033 |
| 2022/0104118 A1* | 3/2022 | Ding | H04W 76/12 |
| 2022/0159605 A1* | 5/2022 | Li | H04W 60/00 |

FOREIGN PATENT DOCUMENTS

| | | |
|---|---|---|
| CN | 101730174 A | 6/2010 |
| CN | 103974383 A | 8/2014 |
| CN | 107018542 A | 8/2017 |
| CN | 107466483 A | 12/2017 |
| CN | 108347748 A | 7/2018 |
| CN | 108811000 A | 11/2018 |
| CN | 109922472 A | 6/2019 |
| EP | 2836018 A1 | 2/2015 |
| EP | 3281473 A1 | 2/2018 |
| EP | 3281473 A4 | 4/2018 |
| RU | 2656715 C1 | 6/2018 |
| WO | 2010115461 A1 | 10/2010 |
| WO | 2017174550 A1 | 10/2017 |
| WO | 2018145248 A1 | 8/2018 |
| WO | 2019077011 A1 | 4/2019 |
| WO | 2019114684 A1 | 6/2019 |

OTHER PUBLICATIONS

3GPP TS 23.503 V15.1.0 (Mar. 2018), Technical Specification Group Services and System Aspects; Policy and Charging Control Framework for the 5G System; Stage 2 (Release 15). 65 pages.

Final Office Action of the U.S. Appl. No. 17/009,641, dated Feb. 22, 2022. 15 pages.

First Office Action of the Canadian application No. 3108401, dated Feb. 18, 2022. 4 pages.

First Office Action of the Chinese application No. 202010525735.1, dated Aug. 4, 2021. 29 pages with English translation.

First Office Action of the U.S. Appl. No. 17/009,641, dated Aug. 17, 2021. 43 pages.

Huawei et al.: "TS 23.503 Pre-configured UE policy", 3GPP Draft; S2-177757 WAS 7719 7155 TS 23.503 Pre-Configured UE Policy, vol. SA WG2, No. Ljubljana, Slovenia Oct. 23, 2017-Oct. 27, 2017 Oct. 30, 2017, XP051360395. 2 pages.

Huawei: "TS 23.502: Discussion about QoS parameter mapping from 5GS to EPS and how to allocate TFT", 3GPP Draft; S2-172012_TS 23.502, vol. SA WG2, No. Busan, Korea Mar. 27, 2017-Mar. 31, 2017 Mar. 26, 2017, XP051247745. 3 pages.

International Search Report in the international application No. PCT/CN2018/079052, dated Dec. 24, 2018. 5 pages with English translation.

Lenovo et al.: "UE Policy configuration (23.503)", 3GPP DRAFT;S2-177244; vol. SA WG2, No. Ljubljana, Slovenia; Oct. 23, 2017-Oct. 27, 2017 Oct. 22, 2017, XP051347200. 7 pages.

Nokia et al: "Discussion on PCC support of EPC IWK", 3GPP Draft; S2-180434_23503, vol. SA WG2, meeting #125;Gothenburg, Sweden; Jan. 22, 2018-JAn. 26, 2018 Jan. 16, 2018, XP051389858. 2 pages.

Notice of Allowance of the U.S. Appl. No. 17/009,641, dated Apr. 19, 2022. 14 pages.

Office Action of the Indian application No. 202027042605, dated Dec. 7, 2021. 6 pages with English translation.

Office Action of the Indian application No. 202117012734, dated Mar. 8, 2022. 5 pages with English translation.

Supplementary European Search Report in the European application No. 18910013.4, dated Feb. 4, 2021. 12 pages.

Written Opinion of the International Search Authority in the international application No. PCT/CN2018/079052, dated Dec. 24, 2018. 9 pages with English translation.

Corrected Notice of Allowance of the U.S. Appl. No. 17/009,641, dated Jul. 20, 2022. 7 pages.

First Office Action of the Chinese application No. 202110088081.5, dated Jul. 8, 2022. 13 pages with English Translation.

Notice of Allowance of the U.S. Appl. No. 17/009,641, dated Jul. 11, 2022. 30 pages.

Written Opinion of the Singaporean application No. 11202008917Q, dated May 23, 2022. 9 pages.

International Search Report in the international application No. PCT/CN2019/096231, dated Apr. 1, 2020.

3rd Generation Partnership Project; Technical Specification Group Services and System Aspects; Policy and Charging Control Framework for the 5G System; Stage 2 (Release 16), 3GPP TS 23.503 V16.0.0 (Mar. 2019).

Qualcomm Incorporated, AT&T, Ericsson, "Use of the URSP rules when UE attaches to EPS", 3GPP TSG-SA WG2 Meeting #134, S2-1907194, Jun. 24-28, 2019, Sapporo, Japan.

NTT DOCOMO: "A new annex for session parameters mapping from EPS to 5GS", 3GPP Draft; S2-174565, vol. SA WG2, No. Cabo, Mexico: Jun. 20, 2017 (Jun. 20, 2017), XP051309619.

Supplementary European Search Report in the European application No. 19934360.9, dated Jul. 30, 2021.

First Office Action of the U.S. Appl. No. 17/164,549, dated Apr. 19, 2021.

Notice of Allowance of the U.S. Appl. No. 17/164,549, dated Aug. 3, 2021.

Corrected Notice of Allowability of the U.S. Appl. No. 17/164,549, dated Nov. 10, 2021.

First Office Action of the Russian application No. 2021104571, dated Aug. 10, 2022. 12 pages with English translation.

* cited by examiner # POLICY MAPPING METHOD AND DEVICE, AND USER EQUIPMENT

CROSS-REFERENCE TO RELATED APPLICATIONS

This application is a continuation application of U.S. patent application Ser. No. 17/164,549 filed on Feb. 1, 2021, which is a continuation application of International Patent Application No. PCT/CN2019/096231 filed on Jul. 16, 2019, to which claim amendments were made on Aug. 13, 2020 under PCT Article 19, the contents of which are all incorporated herein by reference in their entirety.

TECHNICAL FIELD

Embodiments of the disclosure relate to the technical field of mobile communication, and particularly to a policy mapping method and device and user equipment (UE).

BACKGROUND

Some UE policies are defined in a 4th Generation (4G) mobile communication system, for example, an access network discovery and selection policy (ANDSP). Thus, it is necessary to deploy an ANDSF network element in a 4G network for UE to acquire the ANDSP. However, many service providers have yet not deployed or planned to deploy ANDSFs so far. As a result, UE cannot determine which UE policy is needed to be used in a 4G mobile communication system.

SUMMARY

The embodiments of the disclosure provide a policy mapping method and device and UE.

The embodiments of the disclosure provide a method for policy mapping, which is implemented by a user equipment (UE) and includes: mapping a first policy used in a first mobile communication system into a second policy used in a second mobile communication system. The first policy used in the first mobile communication system may include a UE route selection policy (URSP). The UE may map all rules or part of rules of the URSP to the second mobile communication system for use. A first rule of the URSP used in the first mobile communication system and a second rule of the second policy used in the second mobile communication system may correspond to a same rule precedence. The second rule may be obtained by mapping the first rule.

The embodiments of the disclosure provide a device for policy mapping, which includes a processor and a transceiver connected to the processor and configured to transmit and receive information under control of the processor. The processor is configured to map a first policy used in a first mobile communication system into a second policy used in a second mobile communication system. The first policy used in the first mobile communication system may include a UE route selection policy (URSP). The processor is configured to map all rules or part of rules of the URSP to the second mobile communication system for use. A first rule of the URSP used in the first mobile communication system and a second rule of the second policy used in the second mobile communication system may correspond to a same rule precedence. The second rule may be obtained by mapping the first rule.

The embodiments of the disclosure provide UE, which may include a processor and a memory. The memory may be configured to store a computer program, and the processor may be configured to call and run the computer program stored in the memory to execute the policy mapping method.

The embodiments of the disclosure provide a chip, which may be configured to implement the policy mapping method.

Specifically, the chip may include a processor, configured to call and run a computer program in a memory to enable a device installed with the chip to execute the policy mapping method.

The embodiments of the disclosure provide a non-transitory computer-readable storage medium, which may be configured to store a computer program, the computer program enabling a computer to execute the policy mapping method.

Through the technical solutions, the UE may map policies used in a first mobile communication system to a policy used in a second mobile communication system, so that when the UE moves from the first mobile communication system to the second mobile communication system, the policy obtained by mapping may be used in the second mobile communication system.

BRIEF DESCRIPTION OF THE DRAWINGS

The drawings described herein are adopted to provide a further understanding to the application and form a part of the disclosure. Schematic embodiments of the disclosure and descriptions thereof are adopted to explain the application and not intended to form improper limits to the application. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the application without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
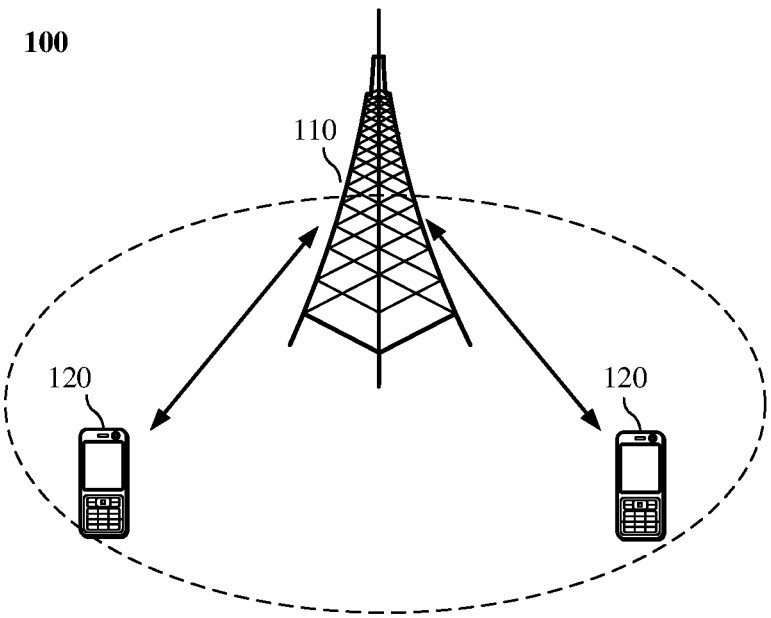
FIG. 1 is a schematic diagram of an architecture of a communication system according to an embodiment of the disclosure.

Exemplarily, a communication system 100 that the embodiments of the disclosure are applied to is shown in FIG. 1. The communication system 100 may include a network device 110, and the network device 110 may be a device communicating with a terminal 120 (or called a communication terminal and a terminal). The network device 110 may provide communication coverage for a specific geographical region and may communicate with a terminal located in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 may further include at least one terminal 120 within the coverage of the network device 110. A "terminal" used herein includes, but not limited to, a device configured to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another terminal, and/or an Internet of Things (IoT) device. The terminal configured to communicate through a wireless interface may be called a "wireless communication terminal", a "wireless terminal" or a "mobile terminal." Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal in the 5G network, a terminal in the future evolved PLMN or the like.

Optionally, Device to Device (D2D) communication may be performed between the terminals.

Optionally, the 5G system or the 5G network may also be called a New Radio (NR) system or an NR network.

A network device and two terminals are exemplarily shown in FIG. 1. Optionally, the communication system 100 may include multiple network devices and another number of terminals may be included in coverage of each network device. There are no limits made thereto in the embodiments of the disclosure.

Optionally, the communication system 100 may further include another network entity such as a network controller and a mobility management entity. No limits are made thereto in the embodiments of the disclosure.

It is to be understood that a device with a communication function in the network/system in the embodiments of the disclosure may be called a communication device. For example, for the communication system 100 shown in FIG. 1, communication devices may include the network device 110 and terminal 120 with the communication function. The network device 110 and the terminal 120 may be the specific devices mentioned above and will not be elaborated herein. The communication devices may further include other devices in the communication system 100, for example, other network entities like a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to make the technical solutions of the embodiments of the disclosure convenient to be understood, technologies involved in the embodiments of the disclosure will be described below.

5G Network Architecture

Figure 2:
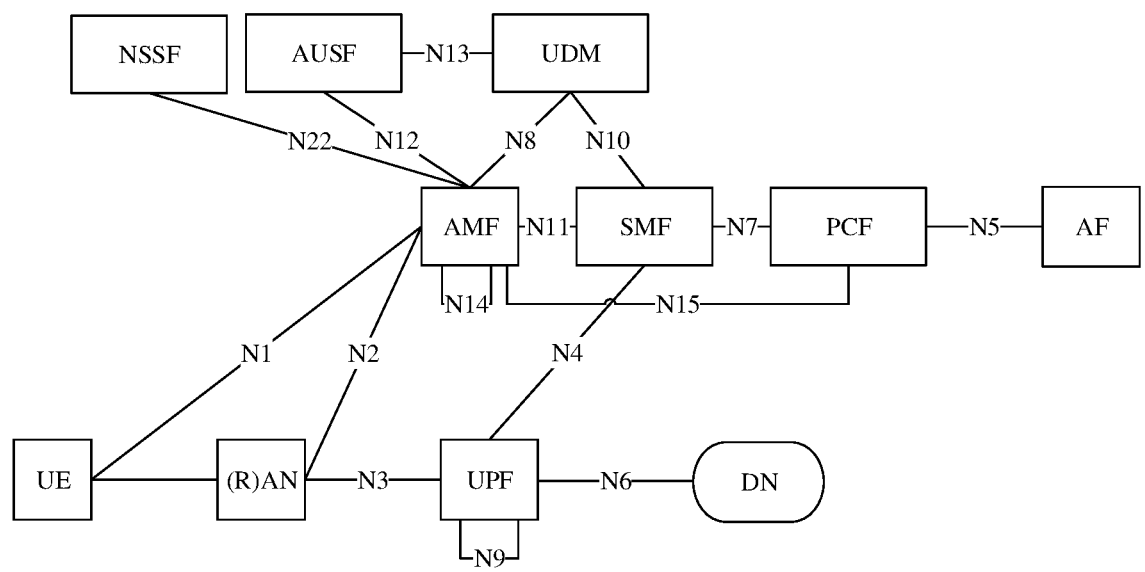
FIG. 2 is a system architecture diagram of a 5th-Generation (5G) network according to an embodiment of the disclosure.

FIG. 2 is a system architecture diagram of a 5G network according to an embodiment of the disclosure. As shown in FIG. 2, devices involved in a 5G network system include:

UE, a Radio Access Network (RAN), a User Plane Function (UPF), a Data Network (DN), an Access and Mobility Management Function (AMF), a Session Management Function (SMF), a Policy Control Function (PCF), an Application Function (AF), an Authentication Server Function (AUSF) and Unified Data Management (UDM).

As shown in FIG. 2, policy related network elements mainly include the PCF, the AMF, the SMF, the RAN and the UE. The SMF is mainly responsible for executing session related policies. The AMF is mainly responsible for executing access and UE policy related policies. Policy transmission and update of both the two network elements (the AMF and the SMF) are managed and controlled by the PCF.

For a UE policy, UE policy related information, including a content of the UE policy, an identifier of the UE policy and the like, may be monitored between the PCF and the UE through a container. In an uplink direction, the container may be sent to the AMF by the UE through a non-access stratum (NAS) message and may be continued to be transparently transmitted (without perception or modification) to the PCF by the AMF. Reversely, in a downlink direction, the container may be sent to the AMF by the PCF and may be further transparently transmitted to the UE by the AMF through a NAS message.

5G UE Policy and Configuration Thereof

A UE policy may include an ANDSP and a URSP. The ANDSP may include a WLAN Selection Policy (WLANSP) and selection information of an evolved Packet Data Gateway (ePDG)/Non-3rd Generation Partnership Project (3GPP) InterWorking Function (N3IWF) network element. In the ANDSP, the WLANSP is mandatory, and the selection information of the ePDG/N3IWF network element is optional.

1) The WLANSP: the WLANSP includes multiple rules (called WLANSP rules), which are used by UE for selecting a WLAN access point.

2) The URSP: the URSP includes multiple rules (called URSP rules), and each URSP rule consists of a traffic descriptor and a group of route selection descriptors (RSDs). The traffic descriptor in the URSP is configured to describe a specific service. For example, a microblog service may be described with internet protocol (IP) @1-9. For another example, an IP Multimedia Subsystem (IMS) service may be described with an IMS data network name (DNN). Then, there may be one or more RSDs under a traffic descriptor, and each RSD corresponds to an attribute of a PDU session. That is, service data corresponding to the traffic descriptor may be transmitted in the PDU session corresponding to the RSD. A related content of the URSP is shown in Table 1 and Table 2.

TABLE 1

URSP Rule

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s).(NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |

TABLE 1-continued

URSP Rule

| Information name | Description | Category | PCF permitted to modify in a UE context | Scope |
|---|---|---|---|---|
| Non-IP descriptors (NOTE 5) | Descriptor(s) for destination information of non-IP traffic | Optional | Yes | UE context |
| Rule Precedence | Determines the order the URSP rule is enforced in the UE. | Mandatory (NOTE 1) | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

TABLE 2

RSD

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3 GPP or Multi-Access) when the UE establishes a PDU Session for the matching application. | Optional | Yes | UE context |
| Route Selection Validation Criteria (NOTE 6) | This part defines the Route Validation Criteria components | Optional | | |

TABLE 2-continued

| Information name | Description | Category | PCF permitted to modify in URSP | Scope |
|---|---|---|---|---|
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

Figure 3:
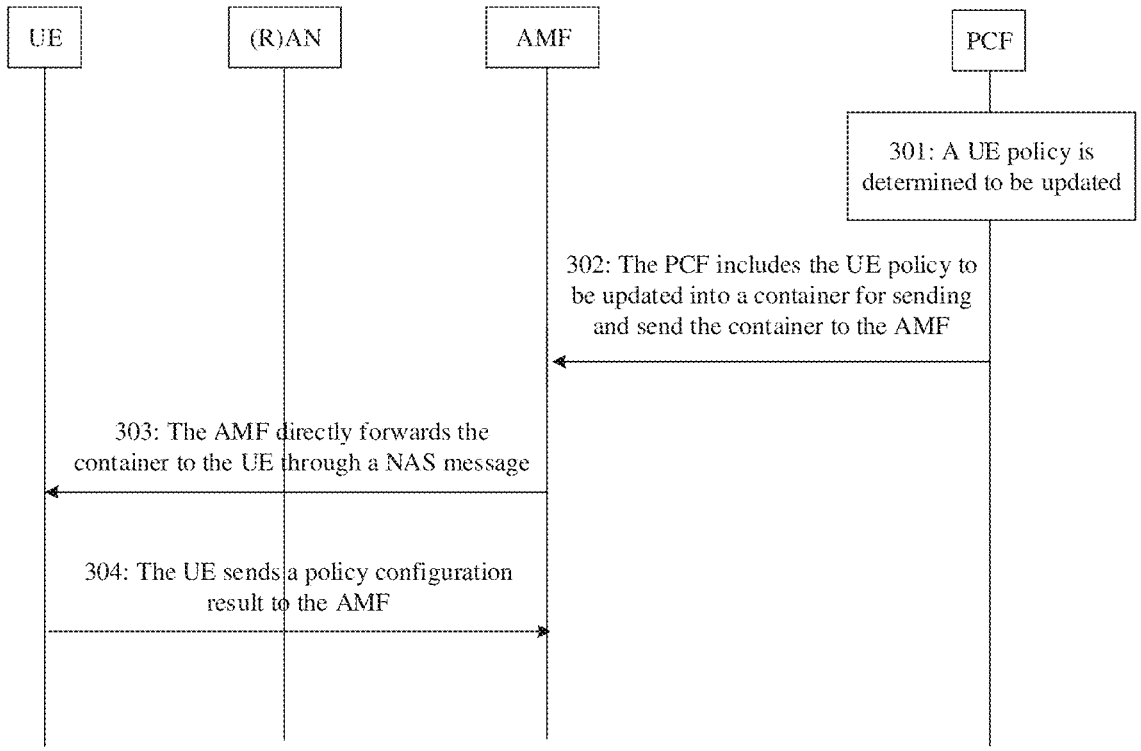
FIG. 3 is a flowchart of UE Configuration Update (UCU) according to an embodiment of the disclosure.

Configuration of a UE policy is implemented through a UCU flow. A connection architecture of each network element in the UCU flow may refer to FIG. 2. As shown in FIG. 3, the UCU flow includes the following operations.

In operation 301, a PCF determines to update a UE policy.

In operation 302, the PCF includes the UE policy to be updated into a container and transmits the container to an AMF.

In operation 303, the AMF directly forwards the container to UE through a NAS message.

In operation 304, the UE sends a policy configuration result (result of the delivery of UE policies) to the AMF.

Figure 4:
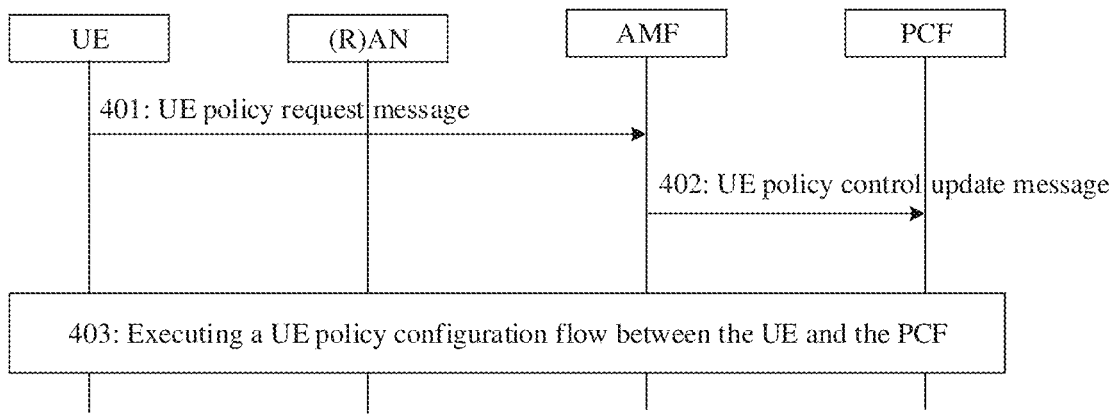
FIG. 4 is a flowchart of actively requesting for a UE policy by UE according to an embodiment of the disclosure.

The 3GPP specifies a flow of actively requesting for a UE policy by UE. As shown in FIG. 4, the flow includes the following operations.

In operation 401, the UE sends a UE policy request message to an AMF.

In operation 402, the AMF sends a UE policy control update message to a PCF.

In operation 403, a UE policy configuration flow is executed between the UE and the PCF.

Herein, the UE policy configuration flow refers to the flow as shown in FIG. 3.

It is to be noted that the UE may simultaneously receive multiple types of UE policies such as a URSP and a Vehicle to Everything (V2X) policy from a network side. On the other hand, the flow of actively requesting for the UE policy by the UE in FIG. 4 is only adopted to request for a UE policy (i.e., a V2X policy) for a V2X service.

In the flows as shown in FIG. 3 and FIG. 4, the UE policy is transmitted in the following manner the UE policy is divided by a network device into one or more policy sections and sent to the UE, each policy section corresponding to a Policy Section Identifier (PSI).

Using Method of 5G URSP

Based on a URSP, UE associates application data with a corresponding PDU session for transmission through the following mechanism.

When there is data in an application layer, the UE may check whether a feature of the application data is matched with a traffic descriptor of a certain rule among URSP rules or not based on the URSP rules of the URSP. A checking sequence may be determined by precedences of the traffic descriptors in the URSP rules. That is, the UE sequentially checks the matching condition based on a sequence of the precedences. When a URSP rule is matched, an RSD list under the URSP rule may be used to associate with a PDU session.

When a URSP rule is matched, the UE may check a proper PDU session according to a sequence of precedences of RSDs. Herein, an RSD with a high precedence is preferred. When a certain parameter of the RSD has one or more values, the UE may select and combine one and another parameter to check whether the PDU session exists or not:

1) If the PDU session exists, the application data may be associated with the session for transmission.

2) If the PDU session does not exist, the UE may trigger establishment of the PDU session and an establishment request message includes an attribute parameter, reported by the UE, of the PDU session.

Furthermore, the following operations are executed:

2.1) If the session is successfully established, the UE associates the application data with the session for transmission.

2.2) If the session fails to be established, the UE checks whether the PDU session exists or not again based on another parameter combination of the RSD or a parameter combination of an RSD with a lower precedence (1 is repeated).

If no proper PDU session can be found for association according to the matched URSP, the UE may sequentially check whether a traffic descriptor in a URSP rule with a lower precedence can be matched with the feature of the application data or not according to the precedences. If matched, the above-described process is repeated.

The process of finding a proper PDU session for an application is called "evaluation" in the disclosure. After the proper PDU session is found and associated, the UE may re-execute evaluation under the following conditions to determine whether an original association between the application data and the PDU session is required to be updated or not. The following conditions includes that:

the PCF updates the URSP;
the UE moves from an Evolved Packet Core (EPC) to a 5G Core (5GC);
an allowed Network Slice Selection Assistant Information (NSSAI) or configured NSSAI is updated;
Local Area Data Network (LADN) DNN availability is updated;
the UE is registered in a 3GPP access network or a non-3GPP access network; and
the UE establishes a connection to a WLAN access network.

4G ANDSP

4G ANDSPs generally include the following types.

1) Inter-System Mobility Policy (IMSP)

UE selects a preferred Radio Access Technology (RAT) to route a data packet based on the IMSP. For example, a core network is connected with two types of RAT access, which are LTE RAT access and WLAN RAT access. The UE may select a type therefrom for transmission of the data packet based on the IMSP.

An ISMP rule may include the following information: a valid condition (for example, time and location), a precedence list of access systems or access networks, and an ISMP rule precedence.

2) Access Network Discovery Information

A network side may send a series of access network information around UE. The information may include: the type of an access system (for example, WLAN and WiMAX), a RAN identifier (for example, a Service Set Identifier (SSID) of the WLAN), other specific technical information (for example, frequency information of one or more carriers) and a validity condition (for example, a location).

3) Inter-System Routing Policy (ISRP)

A data packet may be transmitted through one or more wireless access interfaces (for example, multiple RATs) simultaneously by UE according to the ISRP. There are three types of ISRP, i.e., IP Flow Mobility (IFOM), Multiple Access Public Data Network (PDN) Connectivity (MAP-CON) and Non-Seamless WLAN Offload (NSWO). The first two types are mainly used to associate a specific data flow or a PDN connection with a specific access point name (APN) and access system. The third type may be adopted for indicating whether non-seamless WLAN switching is allowed for a specific data flow or not.

4) Inter-APN Routing Policy (IARP)

The IARP may be adopted for UE to determine specific data flows needed to be transmitted through different PDN connections and specific data flows needing NSWO. For PDN connection transmission, a PDN connection corresponding to a specific APN may also be selected based on the IARP.

5) WLAN Selection Policy (WLANSP)

The WLANSP may be adopted for UE to select a specific WLAN access point (SSID).

The above 4G UE policies may have repeated parts. Thus, maybe only one policy is selected for deployment during practical use.

PDU Session Establishment Flow

Figure 5:
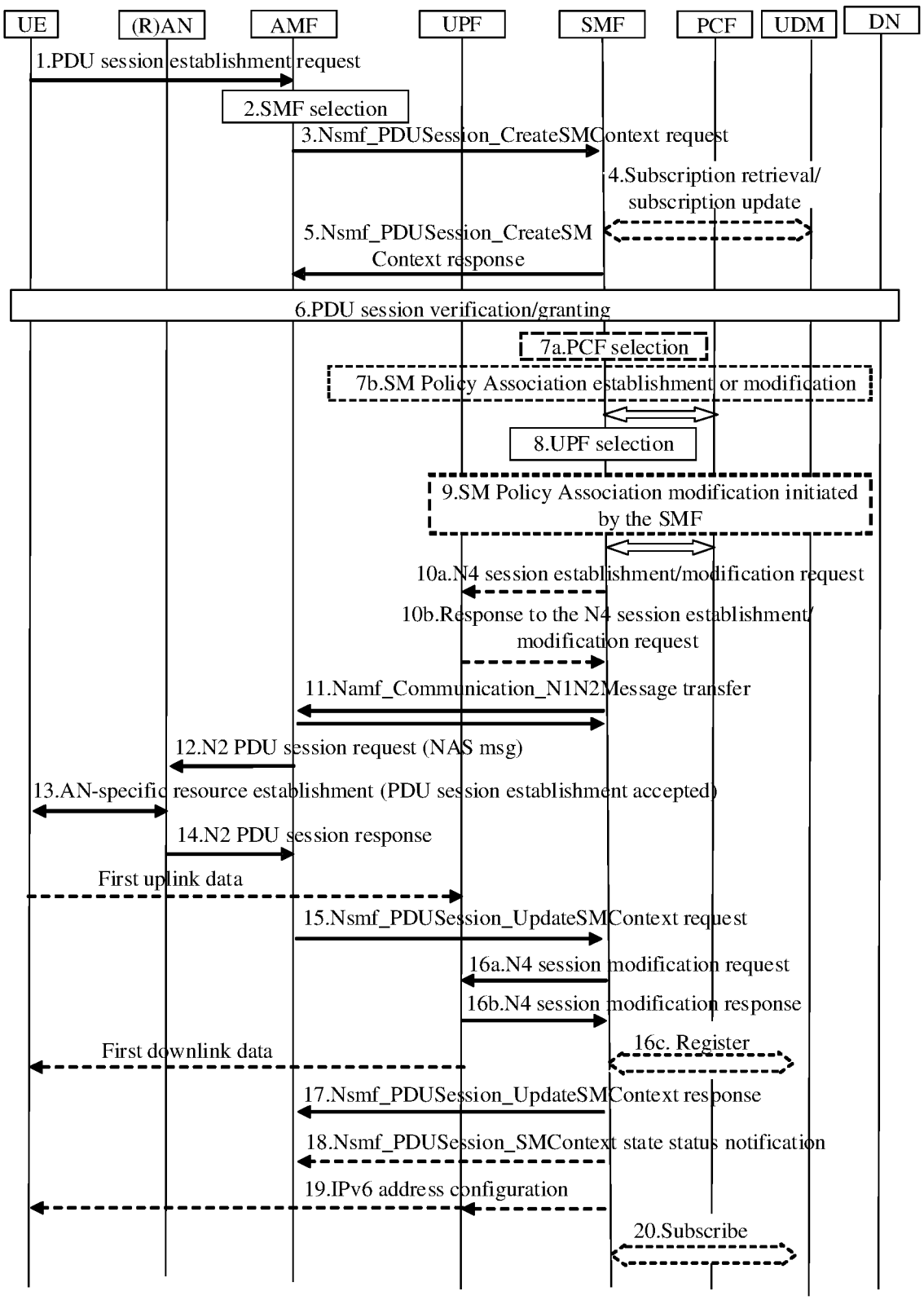
FIG. 5 is a flowchart of establishing a protocol data unit (PDU) session according to an embodiment of the disclosure.

In the PDU session establishment flow, the most important for a UE side is a PDU session establishment request message and a received reply message. FIG. 5 is a flowchart of PDU session establishment. The following operations are included.

In operation 1, a PDU session establishment request message is sent to an AMF by UE through a NAS message. The NAS message may include Single-NSSAI (5-NSSAI)(s), a DNN, a PDU session identifier, a request type, an old PDU session identifier and a Session Management (SM) container. The SM container is also sent to an SMF by the AMF, and mainly includes information related to a session feature. The UE may add an identifier "Always-on is requested" to instruct the SMF to establish an Always-on PDU session in this operation.

In operation 2, the AMF selects the SMF based on the NAS message sent by the UE and sends an N1 NAS container including the NAS message in 1 to the SMF.

In operation 3-10, the SMF determines whether to establish the PDU session or not based on the NAS message from the UE, subscription information and a dynamic or local static policy.

In operation 11-13, the SMF sends a message to a RAN, the message mainly including a parameter such as an N1 SM container, Quality of Service (QoS) information, N2 SM information, [Always-on PDU Session Granted], a selected session and service continuity (SSC) mode, the S-NSSAI(s), the NDD, an allocated IP version 4 (IPv4) address and an interface identifier. The RAN may send the N1 SM container to the UE. The N2 SM information is adopted for the RAN to create a radio bearer. The other parameters such as the parameter [Always-on PDU Session Granted] may also be sent to the UE.

In addition, in a case that the UE does not request Always-on in the PDU session establishment request, the SMF may still determine to set Always-on by itself. In such case, the SMF may add the parameter [Always-on PDU Session Granted] in a PDU session establishment accept message.

The ANDSP is defined in a 4G network, and thus it is necessary to deploy an ANDSP network element in the 4G network for UE to acquire the ANDSP. However, on one hand, many service providers do not deploy or plan to deploy ANDSP network elements, so that it is necessary to consider mapping a policy (UE policy) obtained by the UE from a 5G network to a policy used in the 4G network. On the other hand, service providers are anxious for independently mapping the 5G policy by UE to the 4G network for use and may expect to control part of or all of mapping operations, so that a method is needed to control the mapping operations of the UE.

Figure 6:
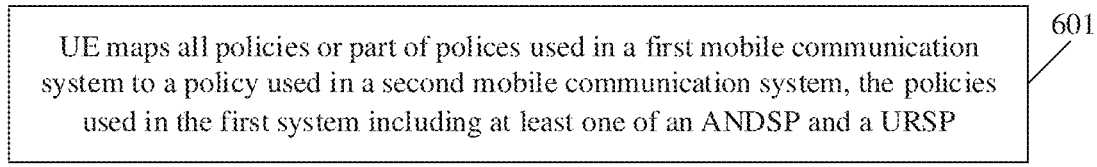
FIG. 6 is a flowchart of a policy mapping method according to an embodiment of the disclosure.

FIG. 6 is a flowchart of a policy mapping method according to an embodiment of the disclosure. As shown in FIG. 6, the policy mapping method includes the following operation.

In operation 601, UE maps all policies or part of policies used in a first mobile communication system to a policy used in a second mobile communication system, the policies used in the first system including at least one of an ANDSF and a URSP.

In the embodiment of the disclosure, the policies may be UE policies. The UE policies include the ANDSP and/or the URSP. The ANDSP may include a WLANSP. Optionally, the ANDSP may further include selection information of an ePDG/N3IWF network element.

Figure 7A:
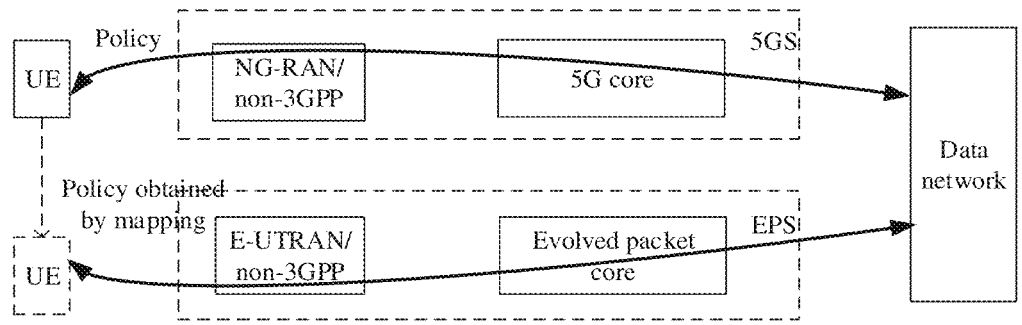
FIG. 7A is a first schematic diagram of policy mapping according to an embodiment of the disclosure.

In an optional implementation mode of the disclosure, the first mobile communication system is a 5G mobile communication system (i.e., a 5G System (5GS)), and the second mobile communication system is a 4G mobile communication system (i.e., an Evolved Packet System (EPS)). In an example, referring to FIG. 7A, the UE, when in the 5GS, may obtain policies used in the 5GS from a network and map all the policies or part of policies used in the 5GS to a policy used in the EPS. How the UE maps the policies will be described below.

1) The policies used in the first mobile communication system at least include the ANDSP, and the UE copies all contents or part of contents of the ANDSP to the second mobile communication system for use.

Figure 7B:
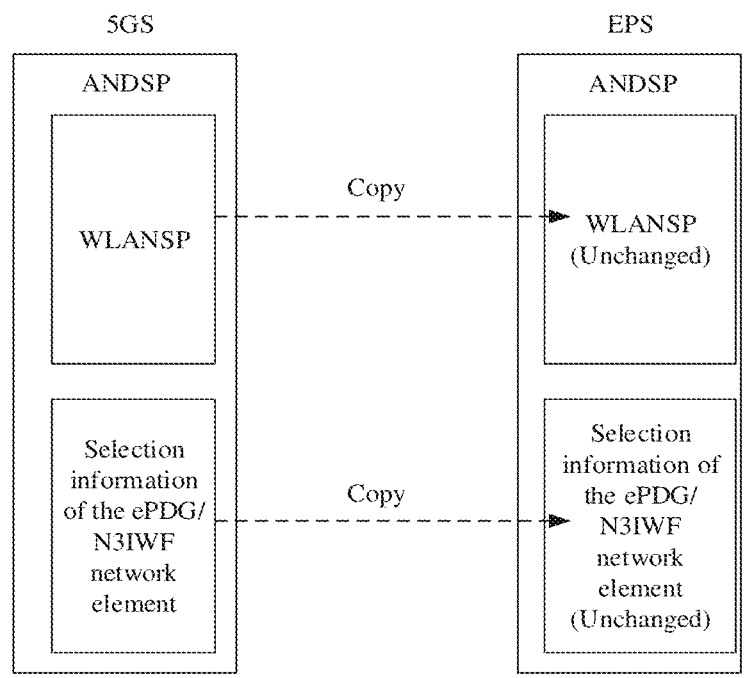
FIG. 7B is a second schematic diagram of policy mapping according to an embodiment of the disclosure.

Referring to FIG. 7B, for mapping of the ANDSP, part (for example, the WLANSP) or all of the ANDSP may be directly copied to the EPS for use without changing any parameter. Contents of the WLANSP and contents of the selection information of the ePDG/N3IWF network element are consistent in the 5GS and the EPS.

2) The policies used in the first mobile communication system at least include the URSP, and the UE copies all rules or part of rules of the URSP to the second mobile communication system for use.

Herein, a first rule used in the first mobile communication system and a second rule used in the second mobile communication system correspond to the same traffic descriptor and/or rule precedence, and the second rule is obtained by mapping the first rule.

Figure 7C:
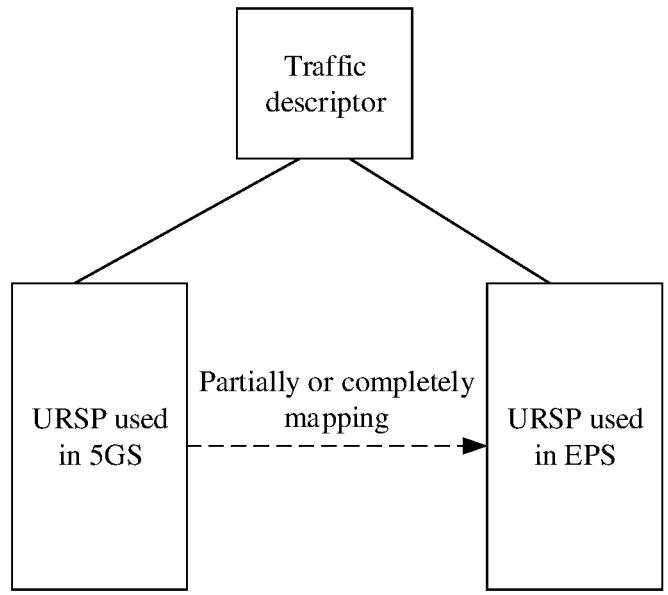
FIG. 7C is a third schematic diagram of policy mapping according to an embodiment of the disclosure.

Referring to FIG. 7C, the URSP includes one or more URSP rules. For mapping of the URSP, part of URSP rules or all the URSP rules of the URSP may be mapped to the EPS for use. For each URSP rule, the URSP rule in the 5GS and the URSP rule in the EPS share the same traffic descriptor and/or rule precedence.

Furthermore, when one or more first rules of the URSP are needed to be mapped, the UE may map and/or copy at least part of parameters of RSDs under the one or more first rules to the second mobile communication system for use. In an implementation mode, at least part of parameters (part of parameters or all parameters) of an RSD in the URSP rule in the 5GS may be mapped and/or copied to the EPS for use. Since the URSP rule in the 5GS and the URSP rule in the EPS share the same traffic descriptor, when the UE moves from the 5GS to the EPS, a data flow corresponding to the traffic descriptor may be transmitted in a PDN connection corresponding to the mapped RSD.

In the embodiment of the disclosure, the RSD in the policy used in the first mobile communication system (for example, the 5GS) includes at least one of the following parameters: an SSC mode, S-NSSAI, a PDU session type, a DNN, a non-seamless offload indication, an access type preference, a valid time window and a valid region. An RSD in the policy used in the second mobile communication system (for example, the EPS) may include at least one of the following parameters: an APN, a PDN connection type, a non-seamless offloading indication, an access type preference, a valid time window and a valid region.

The valid time window and the valid region are optionally supported by the UE, namely the UE may be have no capability of recognizing the two parameters. Although other parameters are optionally configured by a network side, the UE, once receiving them, is supposed to be able to recognize them under a normal condition. In addition, each of the S-NSSAI and the DNN may have one or more multiple values, and any other parameters has a single value. It is to be pointed out that the first four parameters (i.e., the SSC mode, the S-NSSAI, the PDU session type and the DNN) are related to a PDU session attribute.

It is to be noted that a PDN connection of the second mobile communication system usually includes the following attribute parameters: an APN and a PDN connection type. In addition, the SSC mode only supports a first SSC mode (i.e., an SSC Mode-1). Therefore, the following policy mapping manner is adopted in the embodiment of the disclosure.

In an optional implementation mode, the UE may map the S-NSSAI and/or the DNN to the APN.

In an optional implementation mode, the UE may map the PDU session type to the PDN connection type.

Furthermore, under the condition that the PDU session type is an Ethernet type, in response to UE and network in the second mobile communication system supporting an Ethernet PDN connection type, the UE may map the PDN connection type to the Ethernet type; and in response to the UE and/or network in the second mobile communication system not supporting the Ethernet type but supporting a non-IP type, the UE may map the PDN connection type to the non-IP type.

In an optional implementation mode, under the condition that the PDU session type in the UE policy in the 5GS is the Ethernet type, in response to UE and network in the EPS supporting the Ethernet PDN connection type, the UE may map the PDN connection type to the Ethernet type; and in response to the UE and/or network in the EPS not supporting the Ethernet type but supporting the non-IP type, the UE may map the PDN connection type to the non-IP type.

Furthermore, under the condition that the PDU session type is an unstructured type, the UE may map the PDN connection type to the non-IP type.

In an optional implementation mode, under the condition that the PDU session type in the UE policy in the 5GS is the unstructured type, the UE may map the PDN connection type to the non-IP type.

In an optional implementation mode, the UE may copy at least one of the non-seamless offload indication, the access type preference, the valid time window and the valid region to the second mobile communication system for use.

In an optional implementation mode, the UE may set the SSC mode in the RSD to be null or a first SSC mode.

It is to be noted that SSC modes in the 5GS include three modes, i.e., SSC Mode-1, SSC Mode-2 and SSC Mode-3 respectively. The SSC Mode-1 is that a UPF does not change after establishment of a PDU session. The SSC Mode-2 is that the network side may change the UPF by triggering break-before-make after establishment of the PDU session. The SSC Mode-3 is that the network side may change the UPF by triggering make-before-break after establishment of the PDU session.

In the embodiment of the disclosure, the UE may map part of parameters or all the parameters of the RSD. Furthermore, optionally, the UE may add a first parameter to the policy obtained by mapping and apply the policy added with the first parameter to the second mobile communication system. Herein, the first parameter may be a parameter dedicated to the second mobile communication system. In an optional implementation mode, after the UE policy in the 5GS is mapped to the policy for the EPS, another parameter may be continued to be added to the policy obtained by mapping to form a new policy for use in the EPS.

Furthermore, the method of the embodiment of the disclosure may further include that: the UE receives first indication information from a network device, the first indication information indicating at least one of:

whether the UE is allowed for policy mapping or not;
a first policy required to be mapped;
a rule available for policy mapping in the first policy;
whether an RSD under each rule of the first policy is available for policy mapping or not;
a parameter available for policy mapping in the RSD; and
a parameter unavailable for policy mapping in the RSD.

In the solution, whether the UE is allowed for policy mapping or not specifically refers to whether the UE is allowed to map the policy used in the first mobile communication system (for example, the 5GS) to the policy used in the second mobile communication system (for example, the EPS) or not.

In the solution, the first policy required to be mapped may include the ANDSP and/or the URSP.

In the solution, the rule available for policy mapping in the first policy may be, for example, whether policy mapping may be performed on the URSP rule in the URSP or not or, for example, whether policy mapping may be performed on a WLANSP rule in the ANDSP or not.

In the solution, whether policy mapping may be performed on the RSD under each rule in the first policy or not may be, for example, whether policy mapping may be performed on an RSD under the URSP rule in the URSP or not.

In the solution, the parameter available for policy mapping in the RSD may be, for example, the S-NSSAI, the DNN, the PDU session type, the non-seamless offload indication, the access type preference, the valid time window and the valid region. The non-seamless offload indication, the access type preference, the valid time window and the valid region may be mapped in a direct copying manner.

In the solution, the parameter unavailable for policy mapping in the RSD may be, for example, the SSC mode.

Implementation of the first indication information will be described below in combination with specific application scenarios.

A first scenario: the network device is a first core network element, the first indication information is sent to a second core network element by the first core network element through a first container, and the first container is sent to the UE by the second core network element through a NAS message.

Herein, the first core network element may be a PCF, and the second core network element may be an AMF. The NAS message refers to a downlink NAS message.

In an implementation mode, the first indication information and the first policy may be transmitted through the same message. In another implementation mode, the first indication information and the first policy may be transmitted through different messages. The first policy is a policy transmitted to the UE by the first core network element.

Furthermore, under the condition that the first indication information and the first policy are transmitted through the same message, the first indication information may be included into a rule of the first rule, and/or, the first indication information may be included into the RSD under the rule of the first policy.

Figure 8:
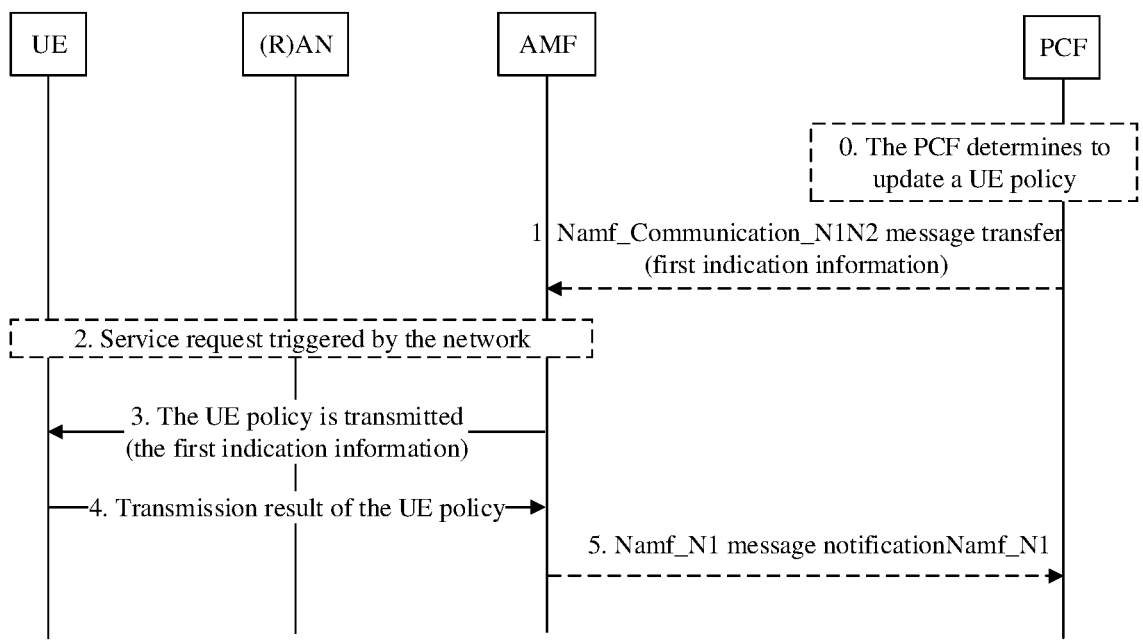
FIG. 8 is a first flowchart of transmitting first indication information according to an embodiment of the disclosure.

Referring to FIG. 8, the PCF may send the first indication information to the UE. The first indication information is included into a container. The container is sent to the AMF from the PCF and transparently transmitted to the UE by the AMF through the downlink NAS message. Namely the container is not required to be checked or modified by an intermediate network element (the AMF and a RAN) when being transmitted to the UE from the PCF. Furthermore, the first indication information may be sent to the UE together with the UE policy through the same message. Specifically, the first indication information may include the following possible forms:

1: The first indication information is independently sent, and the first indication information is independent of other UE policy; and 2: The first indication information is included into a rule of a UE policy. The URSP is taken as an example. The first indication information may be added to a rule or an RSD under the rule. As shown in Table 3, the first indication information is added to the URSP rule, and the first indication information indicates whether the rule is allowed to be (or may be) mapped to a rule used in the EPS or not (simply, whether policy mapping may be performed on the rule or not). In addition, as shown in Table 4, the first indication information may also be added to the RSD under the URSP rule, and the first indication information indicates whether the RSD is allowed to be mapped to a rule parameter used in the EPS or not (simply, whether policy mapping may be performed on the RSD or not). The first indication information may also be added to one or more parameters under the RSD, for example, the first indication information may be added to at least one of the SSC mode, the S-NSSAI, the DNN, the PDU session type, the non-seamless offload indication, the access type preference, the valid time window and the valid region. It is to be noted that the first indication information as shown in Table 3 and Table 4 may be added optionally.

TABLE 3

URSP rule (including first indication information)

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| Rule Precedence | Determines the order the URSP rule is enforced in the UE. | Mandatory (NOTE 1) | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s)for destination information of non-IP traffic | Optional | Yes | UE context |
| DNN | This is matched against the DNN information provided by the application. | Optional | Yes | UE context |
| Rule Precedence | Determines the order the URSP rule is enforced in the UE. | Mandatory (NOTE 1) | Yes | UE context |
| Connection Capabilities | This is matched against the information provided by a UE application when it requests a network connection with certain capabilities. (NOTE 4) | Optional | Yes | UE context |
| First indication information | Indicating whether the rule is allowed to be (may be) configured for mapping to a rule used in the EPS or not | | | |
| List of Route Selection Descriptors | A list of Route Selection Descriptors. The components of a Route Selection Descriptor are described in table 6.6.2.1-3. | Mandatory | | |

TABLE 4

RSD (including first indication information)

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| First | Indicating whether | | | |

TABLE 4-continued

| | | | | |
|---|---|---|---|---|
| | RSD (including first indication information) | | | |

| Information name | Description | Category | PCF permitted to modify in URSP | Scope |
|---|---|---|---|---|
| indication information | the RSD is allowed to be configured for mapping to a rule parameter used in the EPS or not | | | |
| Route selection components | This part defines the route selection components | Mandatory (NOTE 2) | | |
| SSC Mode Selection | One single value of SSC mode. (NOTE 5) | Optional | First indication information | Yes | UE context |
| Network Slice Selection | Either a single value or a list of values of S-NSSAI(s). | Optional (NOTE 3) | First indication information | Yes | UE context |
| DNN Selection | Either a single value or a list of values of DNN(s). | Optional | First indication information | Yes | UE context |
| PDU Session Type Selection | One single value of PDU Session Type | Optional | First indication information | Yes | UE context |
| Non-Seamless Offload indication | Indicates if the traffic of the matching application is to be offloaded to non-3GPP access outside of a PDU Session. | Optional (NOTE 4) | First indication information | Yes | UE context |
| Access Type preference | Indicates the preferred Access Type (3GPP or non-3GPP or Multi-Access) when the UE establishes a PDU Session for the matching application. | Optional | First indication information | Yes | UE context |
| Route Selection Validation Criteria (NOTE 6) | This part defines the Route Validation Criteria components | Optional | | | |
| Time Window | The time window when the matching traffic is allowed. The RSD is not considered to be valid if the current time is not in the time window. | Optional | First indication information | Yes | UE context |
| Location Criteria | The UE location where the matching traffic is allowed. The RSD rule is not considered to be valid if the UE location does not match the location criteria. | Optional | First indication information | Yes | UE context |

In an optional implementation mode, the UE may send second indication information to the network device. The second indication information indicates a policy mapping capability of the UE and/or whether the UE expects to perform policy mapping or not. During specific implementation, the second indication information may be sent to the second core network element (for example, the AMF) by the UE through a second container, and the second container may be sent to the first core network element (for example, the PCF) by the second core network element (for example, the AMF) through a NAS message. Furthermore, the second container is included into a registration request message.

Therefore, the PCF may transmit the first indication information based on the second indication information reported by the UE.

A second scenario: the network device is the second core network element, the first indication information is sent to the UE by the second core network element in a registration process, and the first indication information is included into a registration request reply message.

Herein, the second core network element may be the AMF.

In an optional implementation mode, the UE may send the second indication information to the network device. The second indication information indicates the policy mapping capability of the UE and/or whether the UE expects to perform policy mapping or not. Furthermore, the second indication information is included into the registration request message.

Figure 9:
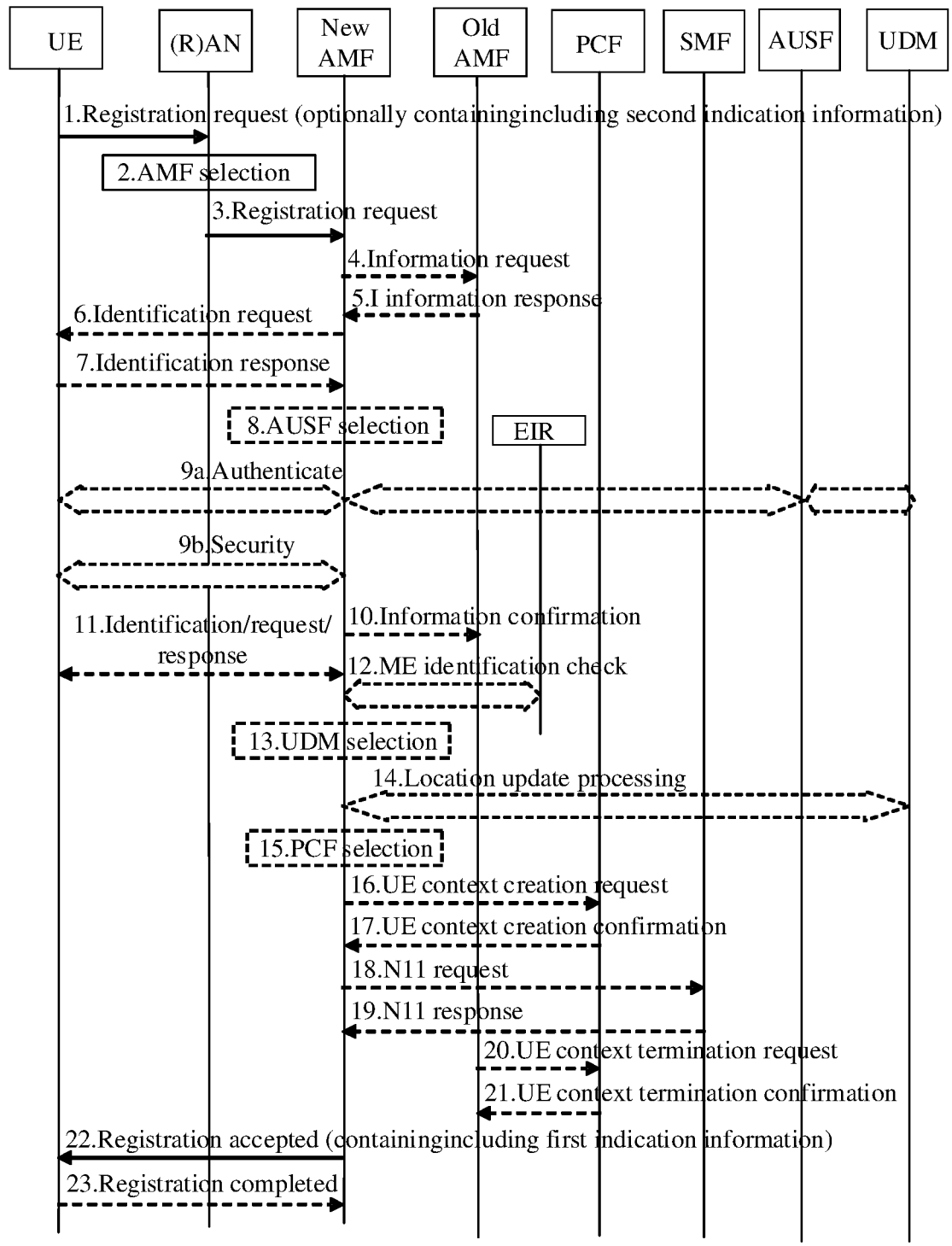
FIG. 9 is a second flowchart of transmitting first indication information according to an embodiment of the disclosure.

Referring to FIG. 9, the UE may report the second indication information in the registration request (the second indication information is optionally reported) such that the AMF may transmit the first indication information based on the second indication information reported by the UE. For example, the AMF may determine whether to allow the UE for policy mapping or not (determining according to the subscription information of the UE or a parameter such as a network slice parameter reported by the UE in the registration request) and notify the first indication information to the UE through the registration request reply message (for example, a registration accept message).

It is to be pointed out that a granularity of policy mapping in the first indication information in the first scenario and the second scenario is not limited in the disclosure. The following third scenario is a solution of performing policy mapping by taking a PDU session as the granularity.

The third scenario: the network device is a third core network element, and the first indication information is sent to the UE by the third core network element in a PDU session establishment or modification process. The PDU session establishment or modification process is implemented to establish or modify a first PDU session and the first PDU session corresponding to a first RSD under the first rule.

Herein, the third core network element may be an SMF.

The first indication information may indicate at least one of:

whether the UE is allowed for policy mapping or not;

whether the first rule corresponding to the first PDU session or not is available for policy mapping;

whether the first RSD under the first rule corresponding to the first PDU session is available for policy mapping or not;

a parameter available for policy mapping in the first RSD; and a parameter unavailable for policy mapping in the first RSD.

In an optional implementation mode, the UE may send the second indication information to the network device, the second indication information indicating the policy mapping capability of the UE and/or whether the UE expects to perform policy mapping or not. Furthermore, the second indication information is included into a PDU session establishment or modification request message.

Figure 10:
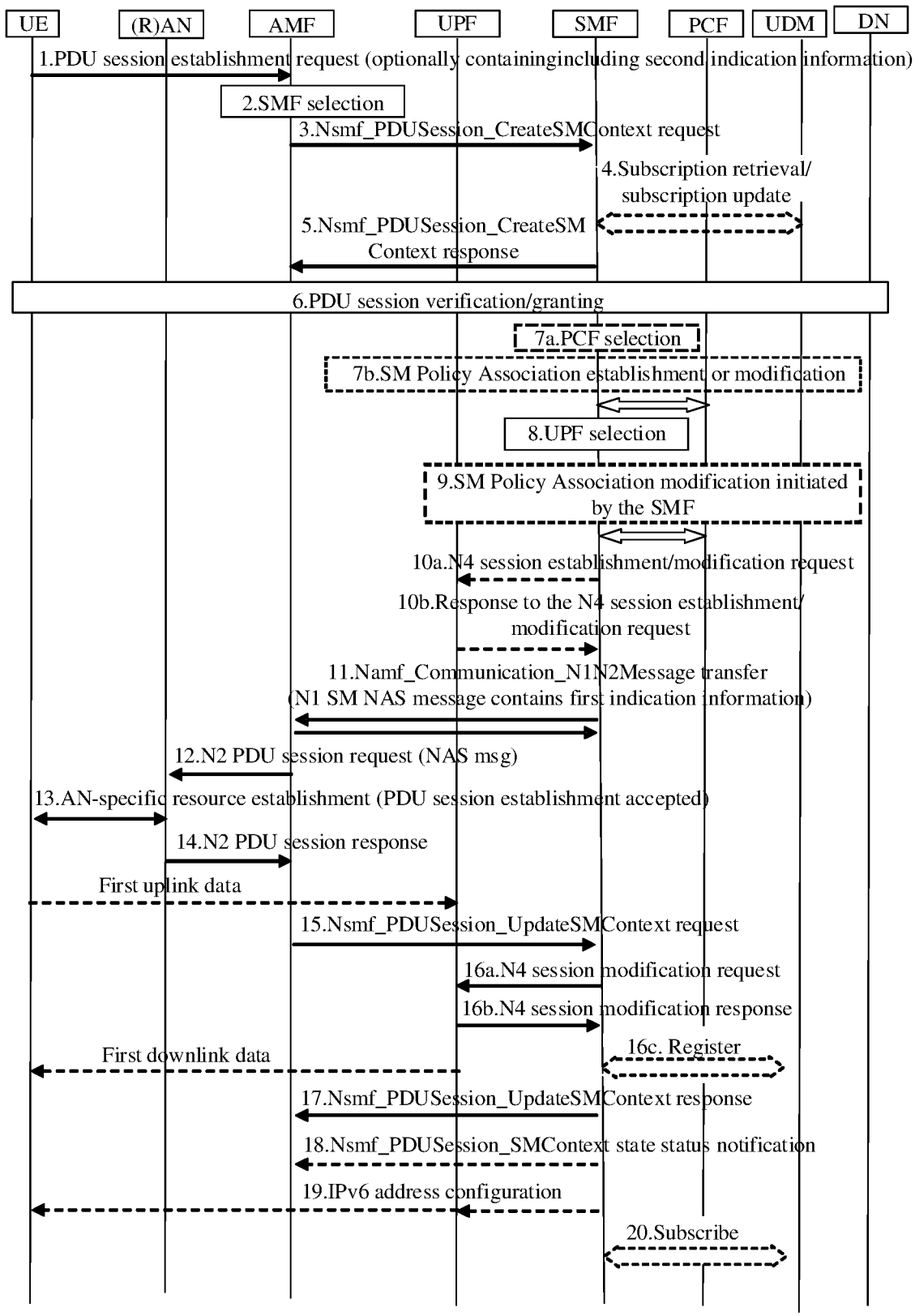
FIG. 10 is a third flowchart of transmitting first indication information according to an embodiment of the disclosure.

Referring to FIG. 10, the UE, when PDU session establishment is triggered, may report the second indication information in the registration request (the second indication information is optionally reported) such that the SMF can transmit the first indication information based on the second indication information reported by the UE. For example, the SMF, after receiving the second indication information, may determine whether to allow the UE to execute policy mapping or not. Similarly, in a PDU session modification flow, the SMF may also interact with the UE through a NAS message to transmit the first indication information to the UE.

It is to be pointed out that, in the third scenario, the first indication information may be transmitted based on the PDU session establishment or modification flow. Thus, policy mapping in the first indication information is that the PDU session is taken as the granularity.

In an optional implementation mode, the URSP includes URSP rule-1/2/3, and the URSP rule-1/2/3 have respective RSD-1/2/3. After a data flow is matched with a traffic descriptor of the URSP rule-2 and is successfully associated with a PDU session corresponding to the RSD-2 based on the RSD under the URSP rule, the UE may: 1) map all or part of parameters of the RSD-1/2/3 under the URSP rule-2 for use when the UE moves to the EPS, or, 2) map all or part of parameters of the RSD-2 under the URSP rule-2 for use when the UE moves to the EPS. For example, when the UE executes the mapping process of 2), a parameter obtained by mapping based on the RSD-2 is a feature parameter corresponding to a PDN connection in the EPS. Furthermore, the data flow matched with the traffic descriptor in the URSP rule-2 may be associated with the PDN connection for transmission.

In the embodiment of the disclosure, data binding under interoperation (including handover or reorientation) from the 5GS to the EPS is considered. Specifically, the UE may execute two processes which are evaluation/re-evaluation and binding/rebinding under a certain condition. However, data of PDN connections corresponding to some PDU sessions should not be rebound immediately because the continuity of a data service may be impacted (for example, an IP address may change). Under the interoperation, the following two session processing methods are adopted.

Condition 1): in a handover process, the network side maps a PDU session to a parameter corresponding to a PDN connection, thereby generating an SM context. In this process, the UE is not needed to request for establishment of the PDN connection, and the parameter related to establishment of the PDN connection is generated by the network side.

Condition 2): for the scenario of reorienting the UE from the 5GS to the EPS through Radio Resource Control (RRC), the UE, after completing RRC establishment with an Evolved UMTS Terrestrial Radio Access Network (E-UTRAN), sends a Tracking Area Update (TAU) request or attach request message. Under this condition, the parameter of the PDN connection corresponding to the PDU session is generated (mapped) by the network side. Under the condition that the UE moves to the EPS, the UE may sends a PDN connection establishment request message, the PDN connection establishment request message including a "handover" tag and a PDU session identifier, such that the network side, after receiving the message, can map a context corresponding to the PDU session identifier to an SM context of the EPS for use.

Based on the above two conditions, the case that the network side maps the parameter of the PDU session to the PDN connection when the UE moves from the 5GS to the EPS is considered, and the UE may be required to keep an association between application data and the corresponding PDN connection to ensure service continuity. That is, the application data originally transmitted in the PDU session is still transmitted in the PDN connection mapped by the network side. For example, data of application-1 may be bound to PDU session-1 in the 5GS. Under the condition that the UE moves from the 5GS to the EPS (a handover or reorientation process is executed), the network side obtains a parameter of PDN connection-1 corresponding to the PDU session-1 by mapping, the UE can determine by mapping based on a UE policy in the 5GS that the application-1 should be bound or preferentially bound to PDN connection-2. In such case, the UE keeps an association between the application-1 and the PDN connection-1 under the condition of moving to the PDN connection-1. The UE, under triggering of a specific condition (for example, the UE enters an idle state or the PDN connection-1 is deleted), may make a new association, namely binding the application-1 to the PDN connection-2.

Based on this, the UE, under the condition of moving from the first mobile communication system to the second mobile communication system, may update an association between data and a first connection according to a policy corresponding to the second mobile communication system. It is to be noted that the policy in the second mobile communication system may be obtained by mapping the policy in the first mobile communication system, or may also be obtained not by mapping the policy in the first mobile communication system, for example, acquiring a policy in the second mobile communication system from the network.

In an optional implementation mode, under the condition that the UE moves to the EPS, the association between the data and the first connection (for example, a PDN connection) is needed to be updated according to the UE policy in the EPS (the UE policy in the EPS may be obtained by mapping the UE policy in the 5GS, or may also be obtained not by mapping the UE policy in the 5GS, for example, acquiring a UE policy in the EPS from the network).

Furthermore, the operation that the association between the data and the first connection is updated according to the policy corresponding to the second mobile communication system may include that: according to the policy corresponding to the second mobile communication system, at least one of the following operations is executed: evaluating the first connection corresponding to the data (i.e., an evaluation operation); and associating the data with the first connection.

In an optional implementation mode, under the condition that the UE moves from the first mobile communication system to the second mobile communication system, when the UE enters an idle state is entered or a first timer expires, the association between the data and the first connection may be updated. In an optional implementation mode, under the condition that the UE moves to the EPS, the UE does not evaluate the UE policy of the EPS in the EPS. When entering the idle state, the UE evaluates the UE policy in the EPS and further associates the data with the PDN connection based on an evaluation result. In an optional implementation mode, under the condition that the UE moves to the EPS, the UE evaluates the UE policy of the EPS in the EPS, but not associates the data with the PDN connection based on the evaluation result until entering the idle state.

In another optional implementation mode, under the condition that the UE moves from the first mobile communication system to the second mobile communication system, the association between the data and the first connection may be updated in a connected state. In an optional implementation mode, under the condition that the UE moves to the EPS, the UE may evaluate the UE policy of the EPS in the EPS in the connected state and associate the data with the PDN connection. It is to be noted that, when the association between the data and the PDN connection corresponding to the PDU session under the two conditions is needed to be changed, the association is changed only when the UE is handed over or reoriented to the EPS and enters the idle state, or certain time expires or a specific bearer or QoS data flow is released.

In an optional implementation mode, the first connection in the solution may be a PDN connection or a PDU session.

In an optional implementation mode, in a voice fallback process of EPS fallback, a PDU session including a QoS flow with a 5G Quality Index (5QI)=1 may be mapped to a PDN connection of a QoS bearer with a QoS Class Identifier (QCI)=1 (herein, the QoS flow/bearer is configured to transmit an IMS data packet) and the PDU session may be then established in the EPS. In such case, although an association evaluated based on the UE policy in the EPS requires an IMS message to be bound to another session for transmission, the association is needed to be changed after the UE enters the idle state in the EPS or the QoS bearer with the QCI=1 is released, otherwise a voice service may be interrupted.

According to the technical solution of the embodiment of the disclosure, a method for mapping a UE policy from the 5GS to the EPS under the control of a service provider is proposed, so that a data flow in the EPS can be managed by use of the UE policy in the 5GS under the condition that no ANDSF network element is deployed in a 4G network for UE policy configuration. In addition, UE policy mapping may be triggered based on different existing flows, so that the impact on an existing protocol and mechanism is reduced.

Most of the examples in the technical solution of the embodiment of the disclosure are based on the scenario that the UE moves from the 5GS to the EPS. It is to be understood that the scenario that the UE moves from the EPS to the 5GS may be also applied to the technical solution of the embodiment of the disclosure.

Figure 11:
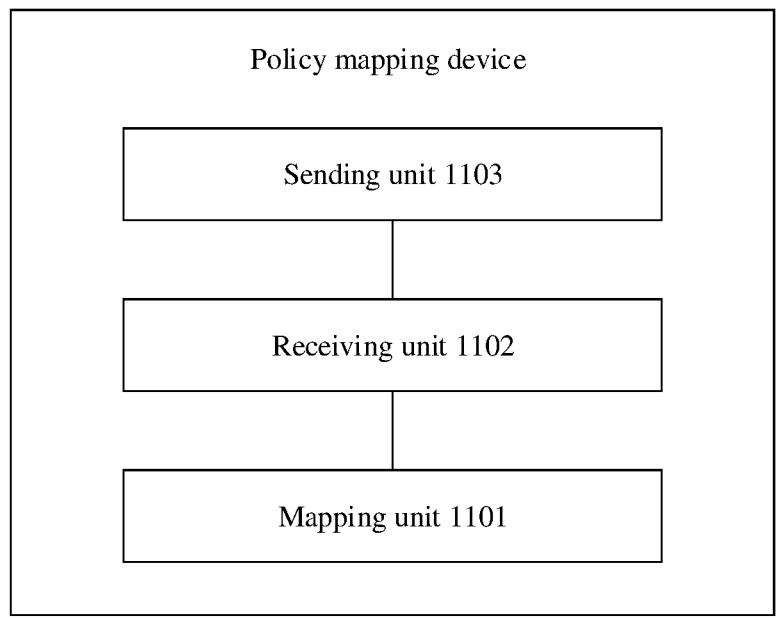
FIG. 11 is a structure composition diagram of a policy mapping device according to an embodiment of the disclosure.

FIG. 11 is a structure composition diagram of a policy mapping device according to an embodiment of the disclosure. As shown in FIG. 11, the policy mapping device includes a mapping unit 1101.

The mapping unit 1101 is configured to map all policies or part of policies used in a first mobile communication system to a policy used in a second mobile communication system, the policies used in the first system including at least one of an ANDSF and a URSP.

In an implementation mode, the policies used in the first mobile communication system may at least include the ANDSP.

The mapping unit 1101 is configured to copy all contents or part of contents of the ANDSP to the second mobile communication system for use.

In an implementation mode, the policies used in the first mobile communication system may at least include the URSP.

The mapping unit 1101 is configured to map all rules or part of rules of the URSP to the second mobile communication system for use.

A first rule used in the first mobile communication system and a second rule used in the second mobile communication system correspond to the same traffic descriptor and/or rule precedence, and the second rule is obtained by mapping the first rule.

In an implementation mode, when one or more first rules of the URSP are needed to be mapped, the mapping unit 1101 may map and/or copy at least part of parameters of RSDs under the one or more first rules to the second mobile communication system for use.

In an implementation mode, the RSD may include at least one of the following parameters: an SSC mode, S-NSSAI, a PDU session type, a DNN, a non-seamless offload indication, an access type preference, a valid time window and a valid region.

In an optional implementation mode, the mapping unit 1101 is configured to map the S-NSSAI and/or the DNN to an APN.

In an optional implementation mode, the mapping unit 1101 is configured to map the PDU session type to a PDN connection type.

In an implementation mode, under the condition that the PDU session type is an Ethernet type, in response to UE and network in the second mobile communication system supporting an Ethernet PDN connection type, the mapping unit 1101 may map the PDN connection type to the Ethernet type; or in response to the UE and/or network in the second mobile communication system not supporting the Ethernet type and supporting a non-IP type, the mapping unit 1101 may map the PDN connection type to the non-IP type.

In an implementation mode, under the condition that the PDU session type is an unstructured type:

the mapping unit 1101 may map the PDN connection type to the non-IP type.

In an implementation mode, the mapping unit 1101 is configured to copy at least one of the non-seamless offload indication, the access type preference, the valid time window and the valid region to the second mobile communication system for use.

In an implementation mode, the device may further include a setting unit, configured to set the SSC mode in the RSD to be null or a first SSC mode.

In an implementation mode, the mapping unit 1101 is further configured to add a first parameter to the policy obtained by mapping and apply the policy added with the first parameter to the second mobile communication system.

In an implementation mode, the device may further include a receiving unit 1102.

The receiving unit 1102 is configured to receive first indication information from a network device, the first indication information indicating at least one of:

whether UE is allowed for policy mapping or not;

a first policy required to be mapped;

a rule available for policy mapping in the first policy;

whether an RSD under each rule of the first policy is available for policy mapping or not;

a parameter available for policy mapping in the RSD; and a parameter unavailable for policy mapping in the RSD.

In an implementation mode, the network device may be a first core network element.

The first indication information may be sent to a second core network element by the first core network element through a first container, and the first container may be sent to the UE by the second core network element through a NAS message.

In an implementation mode, the first indication information and the first policy may be transmitted through the same message or different messages, and the first policy may be a policy transmitted to the UE by the first core network element.

In an implementation mode, under the condition that the first indication information and the first policy may be transmitted through the same message, the first indication information may be included into a rule of the first policy; and/or, the first indication information may be included into a RSD under the rule of the first policy.

In an implementation mode, the device may further include a sending unit 1103.

The sending unit 1103 is configured to send second indication information to the network device, the second indication information indicating a policy mapping capability of the UE and/or whether the UE expects to perform policy mapping or not.

In an implementation mode, the second indication information may be sent to the second core network element by the UE through a second container, and the second container may be sent to the first core network element by the second core network element through a NAS message.

In an implementation mode, the second container may be included into a registration request message.

In an implementation mode, the network device may be the second core network element.

The first indication information may be sent to the UE by the second core network element in a registration process, and the first indication information may be included into a registration request reply message.

In an implementation mode, the device may further include the sending unit 1103.

The sending unit 1103 is configured to send the second indication information to the network device, the second indication information indicating the policy mapping capability of the UE and/or whether the UE expects to perform policy mapping or not.

In an implementation mode, the second container may be included into the registration request message.

In an implementation mode, the device may further include the receiving unit 1102.

The receiving unit 1102 is configured to receive the first indication information from the network device, the first indication information indicating at least one of:

whether the UE is allowed for policy mapping or not;

whether a first rule corresponding to a first PDU session is available for policy mapping or not;

whether a first RSD under the first rule corresponding to the first PDU session is available for policy mapping or not;

a parameter available for policy mapping in the first RSD; and a parameter unavailable for policy mapping in the first RSD.

In an implementation mode, the network device may be a third core network element.

The first indication information may be sent to the UE by the third core network element in a PDU session establishment or modification process. The PDU session establishment or modification process is implemented to establish or modify the first PDU session and the first PDU session corresponding to the first RSD under the first rule.

In an implementation mode, the device may further include the sending unit 1103.

The sending unit 1103 is configured to send the second indication information to the network device, the second indication information indicating the policy mapping capability of the UE and/or whether the UE expects to perform policy mapping or not.

In an implementation mode, the second indication information may be included into a PDU session establishment or modification request message.

In an implementation mode, the device may further include an updating unit 1104, configured to, under the condition that the UE moves from the first mobile communication system to the second mobile communication system, update an association between data and a first connection according to a policy corresponding to the second mobile communication system.

In an implementation mode, the updating unit 1104 is configured to execute at least one of the following operations according to the policy corresponding to the second mobile communication system:

evaluating the first connection corresponding to the data; and associating the data with the first connection.

In an implementation mode, the updating unit 1104 is configured to, under the condition that the UE moves from the first mobile communication system to the second mobile communication system, when the UE enters an idle state or a first timer expires, update the association between the data and the first connection.

In an implementation mode, the updating unit 1104 is configured to, under the condition that the UE moves from the first mobile communication system to the second mobile communication system, update the association between the data and the first connection in a connected state.

In an implementation mode, the first connection may be a PDN connection or a PDU session.

It is understood by those skilled in the art that the related descriptions about the policy mapping device of the embodiments of the disclosure may be understood with reference to the related descriptions about the policy mapping method of the embodiments of the disclosure.

Figure 12:
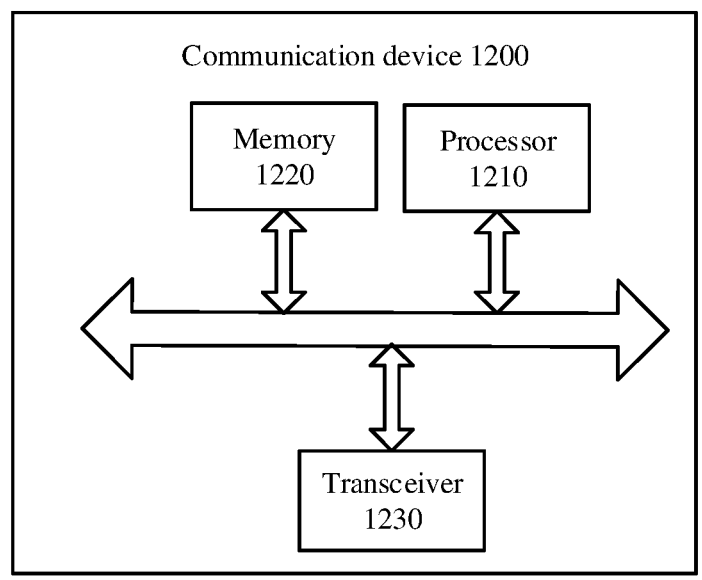
FIG. 12 is a schematic structure diagram of a communication device according to an embodiment of the disclosure.

FIG. 12 is a schematic structure diagram of a communication device 1200 according to an embodiment of the disclosure. The communication device may be a terminal. The communication device 1200 shown in FIG. 12 includes a processor 1210, and the processor 1210 may call and run a computer program in a memory to implement the method in the embodiments of the disclosure.

Optionally, as shown in FIG. 12, the communication device 1200 may further include a memory 1220. The processor 1210 may call and run the computer program in the memory 1220 to implement the method in the embodiments of the disclosure.

The memory 1220 may be an independent device independent of the processor 1210 and may also be integrated into the processor 1210.

Optionally, as shown in FIG. 12, the communication device 1200 may further include a transceiver 1230. The processor 1210 may control the transceiver 1230 to communicate with another device, specifically sending information or data to the another device or receiving information or data sent by the another device.

The transceiver 1230 may include a transmitter and a receiver. The transceiver 1230 may further include antennae, and the number of the antennae may be one or more.

Optionally, the communication device 1200 may specifically be a network device of the embodiment of the disclosure. The communication device 1200 may implement corresponding flows implemented by the network device in each method of the embodiments of the disclosure. For simplicity, elaborations are omitted herein.

Optionally, the communication device 1200 may specifically be the mobile terminal/terminal of the embodiments of the disclosure. The communication device 1200 may implement corresponding flows implemented by the mobile terminal/terminal in each method of the embodiments of the disclosure. For simplicity, elaborations are omitted herein.

Figure 13:
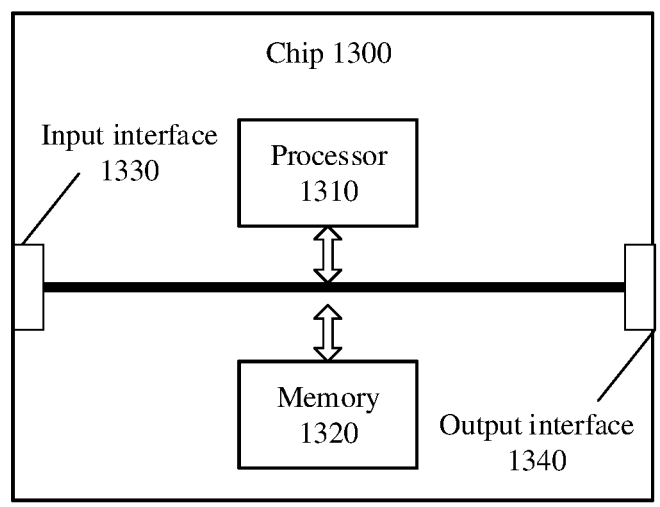
FIG. 13 is a schematic structure diagram of a chip according to another embodiment of the disclosure.

FIG. 13 is a schematic structure diagram of a chip according to another embodiment of the disclosure. The chip 1300 shown in FIG. 13 includes a processor 1310, and the processor 1310 may call and run a computer program in a memory to implement the method in the embodiments of the disclosure.

Optionally, as shown in FIG. 13, the chip 1300 may further include the memory 1320. The processor 1310 may call and run the computer program in the memory 1320 to implement the method in the embodiments of the disclosure.

The memory 1320 may be an independent device independent of the processor 1310 and may also be integrated into the processor 1310.

Optionally, the chip 1300 may further include an input interface 1330. The processor 1310 may control the input interface 1330 to communicate with another device or chip, specifically acquiring information or data sent by the other device or chip.

Optionally, the chip 1300 may further include an output interface 1340. The processor 1310 may control the output interface 1340 to communicate with the other device or chip, specifically outputting information or data sent by the other device or chip.

Optionally, the chip may be applied to the network device of the embodiments of the disclosure. The chip may implement corresponding flows implemented by the network device in each method of the embodiments of the disclosure. For simplicity, elaborations are omitted herein.

Optionally, the chip may be applied to the mobile terminal/terminal of the embodiment of the disclosure. The chip may implement corresponding flows implemented by the mobile terminal/terminal in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 14:
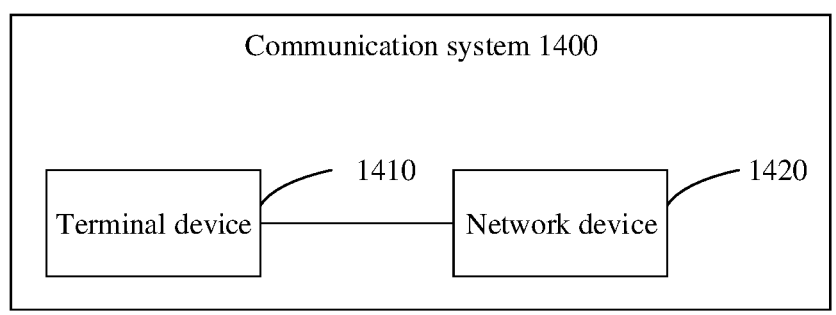
FIG. 14 is a schematic block diagram of a communication system according to an embodiment of the disclosure.

FIG. 14 is a second block diagram of a communication system 1400 according to an embodiment of the disclosure. As shown in FIG. 14, the communication system 1400 includes a terminal 1410 and a network device 1420.

The terminal 1410 may be configured to realize corresponding functions realized by the terminal in the method, and the network device 1420 may be configured to realize corresponding functions realized by the network device in the method. For simplicity, elaborations are omitted herein.

It is to be understood that the processor in the embodiment of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method described in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a non-transitory computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the non-transitory computer-readable storage medium may be applied to a mobile terminal/terminal in the embodiments of the disclosure, and the computer program enables a computer to execute corresponding flows implemented by the mobile terminal/terminal in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal in the embodiments of the disclosure, and the computer program instruction enables the computer to execute corresponding flows implemented by the mobile terminal/terminal in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal in the embodiments of the disclosure, and the computer program runs in the computer to enable the computer to execute corresponding flows implemented by the mobile terminal/terminal in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic. For example, division of the units is only logic function division. Other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated. Parts displayed as units may or may not be physical units, and namely may be located in the same place or may also be distributed to multiple network units. Part or all of the units may be selected to achieve the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a non-transitory computer-readable storage medium. Based on such an understanding, the technical solutions of the disclosure substantially or parts making contributions to the conventional art or part of the technical solutions may be embodied in form of software product. The computer software product may be stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the application shall fall within the scope of protection of the disclosure. Therefore, the scope of protection of the disclosure shall be subject to the scope of protection of the claims.

The invention claimed is:

1. A method for policy mapping, comprising:
mapping, by a user equipment (UE), a first policy used in a first mobile communication system into a second policy used in a second mobile communication system,
wherein the first policy used in the first mobile communication system comprises a UE route selection policy (URSP),
wherein mapping, by the UE, the first policy used in the first mobile communication system into the second policy used in the second mobile communication system comprises:
mapping, by the UE, all rules or part of rules of the URSP to the second mobile communication system for use,
wherein a first rule of the URSP used in the first mobile communication system and a second rule of the second policy used in the second mobile communication system correspond to a same rule precedence, wherein the second rule is obtained by mapping the first rule.

2. The method of claim 1, wherein the first rule used in the first mobile communication system and the second rule used in the second mobile communication system correspond to a same traffic descriptor.

3. The method of claim 1, wherein, in response to the first rule of the URSP being required to be mapped, at least part of parameters of route selection descriptor(s) (RSD(s)) are mapped and/or copied by the UE under the first rule to the second mobile communication system for use.

4. The method of claim 3, wherein the RSD comprises at least one of following parameters:
a session and service continuity (SSC) mode, single network slice selection assistant information (S-NSSAI), a protocol data unit (PDU) session type, a data network name (DNN), a non-seamless offload indication, an access type preference, a valid time window, and a valid region.

5. The method of claim 4, wherein at least one of the S-NSSAI or the DNN is mapped by the UE to an access point name (APN).

6. The method of claim 4, wherein the PDU session type is mapped by the UE to a public data network (PDN) connection type.

7. The method of claim 6, wherein, under a condition that the PDU session type is an Ethernet type,
in response to an Ethernet PDN connection type being supported by UE and a network in the second mobile communication system, the PDN connection type is mapped by the UE to the Ethernet type; or
the UE maps the PDN connection type to the non-IP type.

8. The method of claim 6, wherein, under a condition that the PDU session type is an unstructured type, the PDN connection type is mapped by the UE to the non-IP type.

9. The method of claim 4, wherein at least one of the non-seamless offload indication, the access type preference, the valid time window or the valid region is copied by the UE to the second mobile communication system for use.

10. The method of claim 4, wherein the SSC mode in the RSD is set by the UE to be null or a first SSC mode.

11. A device for policy mapping, comprising:
a processor; and
a transceiver, connected to the processor and configured to transmit and receive information under control of the processor,
wherein the processor is configured to map a first policy used in a first mobile communication system into a second policy used in a second mobile communication system,
wherein the first policy used in the first mobile communication system comprises a user equipment (UE) route selection policy (URSP),
wherein the processor is configured to map all rules or part of rules of the URSP to the second mobile communication system for use,
wherein a first rule of the URSP used in the first mobile communication system and a second rule of the second policy used in the second mobile communication system correspond to a same rule precedence, wherein the second rule is obtained by mapping the first rule.

12. The device of claim 11, wherein the first rule used in the first mobile communication system and the second rule used in the second mobile communication system correspond to a same traffic descriptor.

13. The device of claim 11, wherein the processor is configured to, in response to the first rule of the URSP being required to be mapped, map and/or copy at least part of parameters of route selection descriptor(s) (RSD(s)) under the first rule to the second mobile communication system for use.

14. The device of claim 13, wherein the RSD comprises at least one of following parameters:
a session and service continuity (SSC) mode, single network slice selection assistant information (S-NSSAI), a protocol data unit (PDU) session type, a data network name (DNN), a non-seamless offload indication, an access type preference, a valid time window, and a valid region.

15. The device of claim 14, wherein the processor is configured to map at least one of the S-NSSAI or the DNN to an access point name (APN).

16. The device of claim 14, wherein the processor is configured to map the PDU session type to a public data network (PDN) connection type.

17. The device of claim 16, wherein under a condition that the PDU session type is an Ethernet type, the processor is further configured to:
in response to an Ethernet PDN connection type being supported by UE and a network in the second mobile communication system, map the PDN connection type to the Ethernet type; or
map the PDN connection type to the non-IP type.

18. The device of claim 16, wherein under a condition that the PDU session type is an unstructured type, the processor is further configured to map the PDN connection type to the non-IP type.

19. The device of claim 14, wherein the processor is configured to copy at least one of the non-seamless offload indication, the access type preference, the valid time window or the valid region to the second mobile communication system for use.

20. The device of claim 14, wherein the processor is configured to set the SSC mode in the RSD to be null or a first SSC mode.

* * * * *